United States Patent [19]
Kerho et al.

[11] 3,924,442
[45] Dec. 9, 1975

[54] POLLUTANT VARIATION CORRECTING SYSTEM

[75] Inventors: Stephen E. Kerho, Tustin; Claude S. Lindquist, Huntington Beach; John R. White, Tustin; Bernard P. Breen, Laguna Beach, all of Calif.

[73] Assignee: KVB Equipment Corporation, Tustin, Calif.

[22] Filed: Oct. 9, 1973

[21] Appl. No.: 404,503

[52] U.S. Cl. .................................. 73/1 R; 73/23
[51] Int. Cl.² ................................. G01N 31/00
[58] Field of Search.... 73/1 R, 23; 23/254 R, 255 R

[56] References Cited
UNITED STATES PATENTS
3,634,868   1/1972   Pelavin et al. .............. 73/1 R X
3,756,068   9/1973   Villarroel et al................ 73/23

*Primary Examiner*—Jerry W. Myracle
*Attorney, Agent, or Firm*—Stanley W. Sokoloff

[57] ABSTRACT

A system for continuously measuring volumetric concentrations of gas which is automatically self-calibrating and will correct volumetric measurements to a predetermined reference level. This system performs corrections automatically by electronically operating on signals generated by analyzers which are coupled to probes disposed within the sample.

15 Claims, 2 Drawing Figures

POLLUTANT VARIATION CORRECTING SYSTEM

BACKGROUND OF THE INVENTION

1. Field of the Invention

This invention relates to instrumentation untilized in continuously measuring concentrations of gas.

2. Prior Art

The purpose of the present invention is to provide an automatic means of correcting measured volumetric concentrations of gasses to a constant level of diluent in order to account for air variations and leakage. For example, the flue gas of utility boilers consists primarily of carbon dioxide, water, nitrogen and oxygen with trace amounts of pollutants such as nitric oxide, carbon monoxide, nitrogen dioxide and sulfur dioxide. Most scientific instruments measure and report these trace quantities as volumetric fractions or percents such as parts per million (e.g. number of parts by volume nitric oxide per million parts of flue gas). The nature of volumetric measurements is such that a small change in the relative concentration of one of the primary components automatically changes the volumetric fraction of the remaining components since the total of the volume fractions is constant.

The amounts of $CO_2$ and $H_2O$ in the effluent are governed by the combustion process and are relatively constant. However, the amount of air present may vary significantly. Variations of operating air levels or leakage of air into the flue gas ducts, for example, dilutes the flue gas and proportionately lowers the trace concentrations, resulting in readings which can be very misleading. In order to take this into account, regulatory agencies require that pollutant concentrations be reported at constant levels, such as 325 parts per million NO, corrected for example, to 3% $O_2$. In order to determine the emissions level in these terms, first the actual concentration of diluent air must be measured, then the value of pollutant concentration shown by the analyzer and recorder must be mathematically corrected to a specified level of diluent air each time a reading is taken using hand calculations. Since most analyzers operate continuously, a significant disadvantage of these prior art devices is that there are no means for continuous corrections.

The ability to analyze an effluent sample and determine the concentration of each gas present is well known in the art. Several devices exist employing different techniques, and most are compatible with the present invention. For example, a nitric oxide analyzer may be used to monitor the nitric oxide (NO), such as a Thermo Electron Model 10 Chemiluminescent NO Analyzer manufactured by Thermo Electron Corp. of Waltham Massachusetts. The operational basis of the instruments is the chemiluminescent reaction of NO and $O_3$ to form $NO_2$. Light emission results when electrically excited $NO_2$ molecules revert to their ground state. This resulting chemiluminescent is monitored through an optical filter by a high sensitivity photomultiplier, the output of which is linearly proportional to the NO concentration.

Carbon monoxide concentrations can be measured by a nondispersive infrared analyzer, such as Model 315B Short Pathlength Nondispersive Infrared Analyzer manufactured by Beckman of Fullerton, California. This instrument measures the differential infrared energy absorbed from energy beams passed through a reference cell, and a sample cell through which sample gas continuously flows.

The oxygen content may be determined by an oxygen analyzer, such as a Teledyne Model 326A Process Oxygen Monitor manufactured by Teledyne of San Gabriel, California. It functions by producing an electrical current which is generated in the analyzer by an oxidation-reduction reaction which occurs internally in the oxygen analyzer. The current generated is proportional to the concentration of oxygen.

Although the above analyzing devices function adequately, they are only examples of the types that may be employed in the present invention.

Problems in the prior art inventions occur when meaningful data is attempted to be derived from analyzers disposed within an effluent. The problems occur because there is no method which will allow continuous correction of the pollutant to a reference effluent in the stream resulting in an absolute pollutant emission number. In addition, none of the prior art devices known to the applicant teach a method for periodically calibrating the monitoring devices utilized in the system. If the system becomes uncalibrated, the data derived from the analyzers may become meaningless and misleading.

The present invention becomes particularly important today because of the environmental considerations and restrictions placed upon industry. Federal and State laws have been enacted which require industry to monitor and control effluents which affect the environment and to determine the amount of pollutants exhausted into the atmosphere. Since most manufacturing processes operate continuously, calibration of any monitoring system becomes of major importance. Also, the ability to properly correct readings for air dilution becomes paramount since any small variation can significantly affect the volumetric readings received by the analyzers.

Some attempts have been made in the prior art to correct certain signals for various purposes. However, such prior art did not deal with or solve the particular problems of automatically and continuously correcting signals to account for air leakage or the like, or for properly monitoring effluent gasses. For example, U.S. Pat. No. 3,520,657 (Frumerman) employed an apparatus which measured the flow rate of effluent and concentrations of a tracer gas in the effluent and then performed electronic manipulations on analyzer signals such that a direct reading of flow rates could be obtained. By knowing the flow rates the percent carbon in the steel could be determined by hand calculations. This device is used in steel refining in order to determine the percent carbon in any specific batch of steel in the refining process. The problem this patent solved was to accurately measure the flow rates of effluent since the pressure of the gasses in the effluent varied. In that device, an $N_2O$ trace gas is injected into the effluent at a known flow rate. The partial pressures of the gasses are then determined by analyzers. Signals are then generated which are proportional to the partial pressures of the gasses. Thus, by electronically combining the partial pressure signals and a signal representative of the flow rate of the trace gas, a new signal representative of flow rate of the effluent may be generated. By knowing the flow rates, a hand calculation may be made to determine the amount of carbon in the steel batch. However, to determine these percentages the process must be entirely within a controlled environment (one where no leakage occurs and the total inputs and exhausts of the process are known). The weight of the material burned must be known prior to combustion in order to make the necessary correction and a trace gas must be continuously added to determine the percent of carbon present.

The above device operates adequately when employed in a restricted environment and when the process is not continuous. The device is not self-calibrating and requires hand calculations to be made in order to determine the percent carbon remaining in the steel batch.

U.S. Pat. No. 3,432,288 (Ardito et al.) teaches a device for measuring the concentrations of certain gasses in an effluent and for electronically correcting the measurements to compensate for the amounts of moisture and air in the system. This device was also employed in the steel industry and was used in a top-blown oxygen converter. This patent employed electronic equipment to measure effluent gas and to determine the amount of time required to inject oxygen into steel slag. Analyzers disposed within the effluent measured the content of various gasses and generated signals proportional to the concentration levels. These signals are fed into a analog computer which electronically determines the percent of oxygen in the slag, and displays the results. The electronic apparatus employed, converted the analyzer output signals to direct oxygen readings after correcting for the amount of moisture in the exhaust and the amount of oxygen induced into the system.

The above described device is capable of correcting measured readings electronically under controlled environmental conditions. In many typical industrial applications the environment is not controlled and continuous burning occurs. Consequently, the device is of little use in such applications since the device does not allow for correction of possible contamination caused by leakage or operating variations.

Thus, although the prior art discloses the ability to analyze samples of effluent and determine the various concentrations of gas, they do not solve the problems presently required by industry and government. Often industry requires monitoring devices which can be installed to measure concentrations of pollutants being disbursed into the atmosphere on a continuous basis. Some laws require periodic calibration and correction to a reference level for various gas concentrations. These requirements make the prior art devices inadequate for meaningful pollution control monitoring. The present invention solves the problems and has numerous advantages over the prior art as will be seen hereinafter.

The following U.S. Patents dealing with the analysis and measurements of gasses and/or pollutants are believed to be representative of the general state of the prior art: U.S. Pat. Nos. 3,096,157, 3,181,343, 3,309,684, 3,406,562, 3,432,288, 3,480,397, 3,482,431, 3,485,619, 3,520,657, 3,647,387, 3,677,708, 3,692,485.

SUMMARY OF THE INVENTION

The presently preferred embodiment of the invention is an automatic self-calibrating system which can provide an accurate absolute continuous measure of concentration of gas in a flue gas effluent. The invention draws a sample of effluent gas into the system through a plurality of probes disposed within the effluent stream. The sample is then filtered to remove particulate matter and cooled so that moisture condenses and can be removed. Next, the sample is fed through a plurality of analyzers to determine the concentration levels of specified gasses. These analyzers generate electrical signals representative of the concentration level of the specified gasses. The electrical signals are then fed into a correcting device so that the electrical signal can be corrected to a standard gas concentration reference level. The correcting device electrically manipulates signals from specific gas analyzers according to a unique mathematical relationship predetermined for the gas being monitored. The output of the correcting device is an electrical signal which is fed to a display or monitoring device in order to indicate the corrected concentration levels of the various gasses. In addition, to analyzing gas concentrations, the invention is designed so that it periodically calibrates itself. This is accomplished by an electronic timer which periodically activates valves which prevent sample gas from entering the the system while the sample withdrawal rate remains uninterrupted (to prevent plugging). This same timer then introduces "span" and/or "zero" gas alternately into the analyzers.

Although the present invention is described such that the preferred embodiment is electrically operated, those skilled in the art will understand that the basic concepts and teachings could equally as well be applied to a pneumatic system.

DETAILED DESCRIPTION OF THE INVENTION

Figure 1:
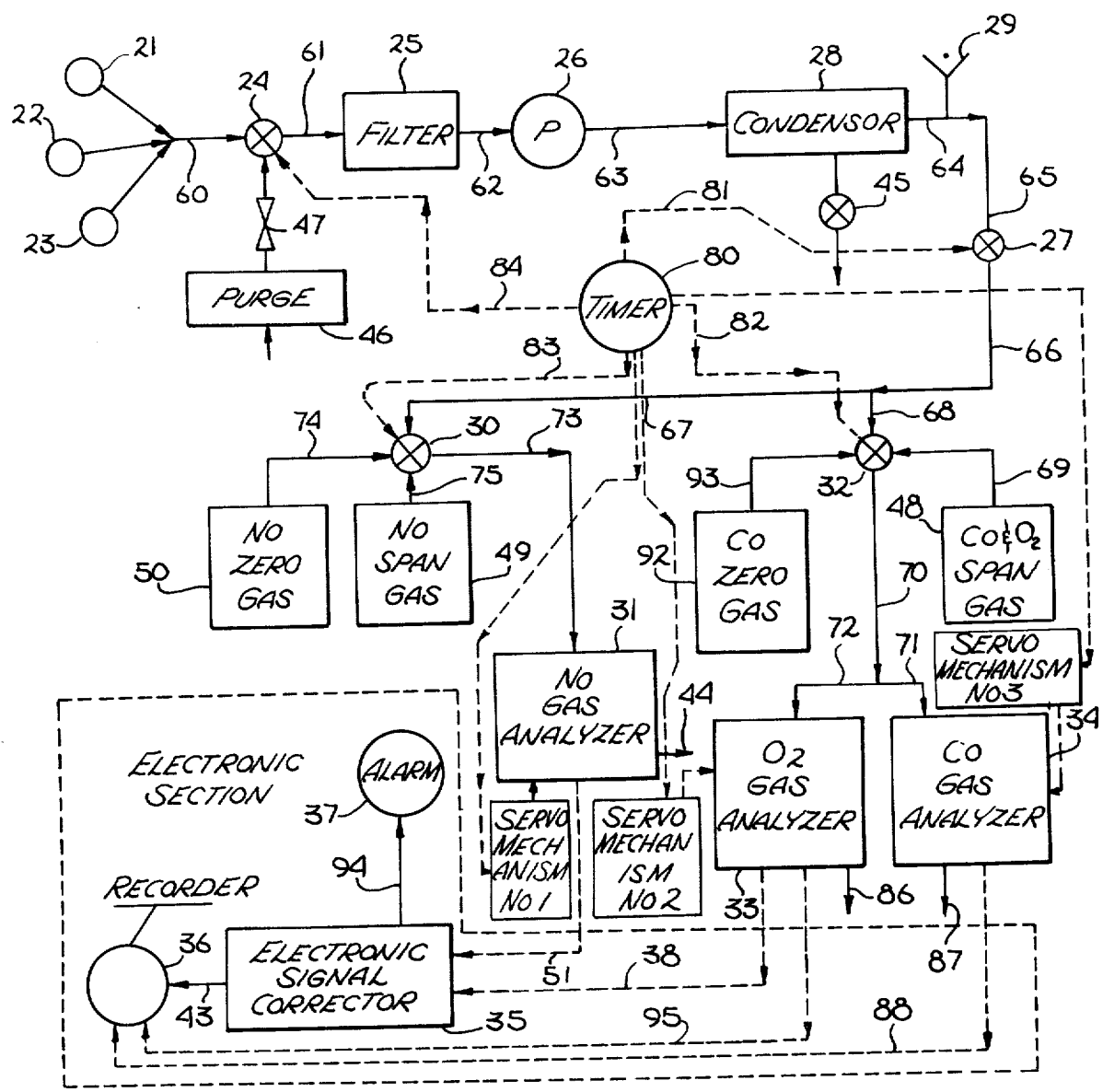
FIG. 1 is a block diagram of the invented automatic self-calibrating system for the continuous monitoring of effluent gas and correcting volumetric gas concentrations to a predetermined base level.

The general purpose of the invention is to provide an automatic method for correcting measured volumetric concentrations of gasses to a reference level of diluent in order to provide absolute measure of the pollutant concentration. The presently preferred embodiment, for example, is a system which will monitor nitric oxide (NO), carbon monoxide (CO) and oxygen ($O_2$) concentrations in the flue gas of utility boilers. The system will also correct the NO reading to a reference level such as X P.P.M. NO corrected to 3% $O_2$. Although the invention is discussed in terms of the presently preferred embodiment it may be utilized in many embodiments where the number of gasses being analyzed is larger or smaller and/or where different gasses are required to be corrected to a standard reference level.

The presently preferred embodiment of the invented system is comprised of generally two parts. The first part of the system involves sampling and analyzing gas concentrations. The second part of the system elctronically manipulates signals derived from the analyzers in the first part to provide an accurate indication of gas concentrations corrected to a predetermined standard or reference level.

In the presently preferred embodiment the flue gas in the boiler ducts contains significant concentration gradients. For this reason a sufficient number of probes have to be disposed within the duct or ducts to insure that a representative sample is taken. Thus, in FIG. 1, three identical probes 21, 22, and 23 are disposed at suitable points in the effluent such that samples may be obtained. The sample is gathered by the probes 21, 22 and 23 and passed into conduit 60 passing through valve 24 which is normally open to allow flow from conduit 60 to 61, but closes to allow back purging of the probes. Back purging is accomplished when valve 24 is adjusted such that purge air 46 can flow through purge valve 47, valve 24, conduit 60 and out through probes 21, 22 and 23. The sample after passing valve 24 is then passed into conduit 61 and through filter 25. The filter 25 preferably comprises 1 and 100 micron elements which remove particulate matter from the sample to provide a relatively clean sample to the analyzers and allow better volumetric gas concentration measurements. The sample is then passed from filter 25 through conduit 62 into pump 26, which in the presently preferred embodiment is a standard diaphragm type compressor. The pump 26 supplies the force to draw the sample from the effluent and pass the sample through the system. The sample flows from the pump 26 into conduit 63 and to condenser 28 and into conduit 64. A standard refrigerator type condenser 28 well known in the art, is used in the presently preferred embodiment to remove excess moisture from the sample by lowering the temperature of the sample to a dew point of approximately 35° F. The sample then passes through the pressure relief valve 29, into conduit 65 and through valve 27, which is normally open to allow flow from conduit 65 to 66, but closes to allow system calibration, while at the same time causing the sample to dump through the pressure relief valve 29. The sample is then divided into two portions. The first portion flows into conduit 67 and the second portion flows into conduit 68. The first portion passes into flow control valve 30 which normally passes sample gas into conduit 73. However, valve 30 may restrict sample flow into conduit 73 and pass either zero or span calibration gas into conduit 73. This first portion of the sample is finally passed through valve 30 and conduit 73 into the nitric oxide (NO) analyzer 31 and vented into the atmosphere through vent 44. The NO analyzer 31 in the presently preferred embodiment is comprised of rotameters and control valves for instrument flow control and a chemiluminescent NO analyzer as previously described.

The second sample portion passes from conduit 66 through conduit 68 and into flow control valve 32 which normally passes sample gas into conduit 70. However, valve 32 may restrict sample flow into conduit 70 and pass span or zero gas into conduit 70. In operating conditions this second portion of the sample is passed through valve 32, conduit 70 and again split into a third and fourth portion. The third portion of the sample flows through conduit 72 and into a typical oxygen ($O_2$) analyzer 33 as previously described, then vented into the atmosphere through vent 86. The fourth portion of the sample flows through conduit 71 and into a typical infrared carbon monoxide (CO) analyzer 34 as previously described, and is then vented into the atmosphere through vent 87.

The sample and calibration gas flow through the system is controlled by an electrical timer 80. In normal sample operation the valves 24, 27, 30 and 32 are open to permit sample gas to pass through the system. At predetermined intervals the timer 80 generates an electrical signal on line 81 which activates valve 27 and stops sample flow. Calibration of the gas analyzers 31, 33 and 34 can then be accomplished by introducing first zero and then span gas. Zero gas is defined herein as gas which will contain negligble concentrations of the gas being considered. Span gas is defined as gas which will contain sufficient concentrations of the gas being considered to cause near maximum scale readings of the particular analyzer. Timer 80 generates an electrical signal along line 82 which activates valve 32 such that span CO and $O_2$ gas 48 can be introduced into the CO analyzer 34 and $O_2$ analyzer 33 through conduits 69, 70, 71, 72 and valve 32. (Note that all electrical signals are shown dotted in the drawings to distinguish them from other mechanical parts of the system). The same signal also activates valve 32 such that zero CO gas 92 may flow through conduits 93, 70, 71 and valve 32 and into the CO analyzer 34. The timer also generates an electrical signal along line 83 which first activates valve 30 such that zero NO gas 50 is introduced into the NO analyzer 31 through conduits 74, 73 and valve 30, and then the valve is again activated such that only span NO gas 49 is introduced into the NO analyzer 31 through conduits 73, 75 and valve 30. Upon completion of the calibration the timer 80 generates another set of signals which allow the valves to pass sample gas through the system.

The timer also generates at predetermined intervals electrical signal along line 84 which activates valve 24 allowing purge air 46 to flow through purge valve 47, valve 24, conduit 60 and out of the system through the probes 21, 22 and 23.

Each of the gas analyzers 31, 33 and 34 generate electrical signals which are representative of the measured concentration of gas in the sample. For example, the NO analyzer 31 produces an electrical signal on line 51 and the CO analyzer 34 produces an electrical signal on line 88 while the $O_2$ analyzer 33 produces two identical electrical signal on lines 38 and 95. Lines 38 and 51 pass to the electronic signal corrector 35 while the signal on line 88 and 95 pass directly to an indicator such as multipoint pen recorder 36.

The invented monitoring system allows one or more of the gas concentrations to be corrected to a predetermined reference level. This predetermined reference level is normally set to a theoretical or standard concentration, such as 3% $O_2$ based on the combustion characteristics of the process. This correction is done to eliminate the possibility of errors caused by variations in dilutants and contaminants, such as air in the effluent prior to sampling. The correcting device 35 in the presently preferred embodiment requires an elctrical input signal on line 51 from the NO analyzer 31 and an electrical input signal on line 38 from the $O_2$ analyzer 33. The correcting device 35 manipulates these electrical signals according to a unique mathematical relationship and generates an electrical signal on line 43 which is representative of the concentration of NO being exhausted by the combustion process.

The output signal on line 43 from the correcting device 35 and electrical signals on lines 95 and 88 from the $O_2$ analyzer 31 and CO analyzer 34 respectively are fed into a suitable pen or multipoint recorder 36. This recorder 36 provides a continuous record of the concentration of the various gasses being analyzed. The electronic signal corrector 35 may also be connected to an alarm 37 which may be used to warn an operator that a gas concentration level has exceeded an allowable value and that correction procedures should be commenced.

The automatic electronic correcting device 35 manipulates electrical signals according to a unique mathmatical relationship. The derivation of this relationship is shown below. The variables in the derivation are:

$Y$ = measured volumetric or molar % of $O_2$
$X$ = % $O_2$ which the pollutant is to be corrected to, i.e. the reference dilutent level
$NO_Y$ = parts per million of NO at $Y$ % $O_2$
$NO_x$ = parts per million of NO at $X$ % $O_2$
$M_g$ = mole weight of dry effluent gas
$M_a$ = mole weight of air
$\phi$ = mole fraction of $O_2$ in air, i.e. known to be 0.21

If 100 moles of gas is taken as a sample basis of calculation which contains $Y$% $O_2$ and $NO_Y$ parts per million of NO then the:

Moles of $O_2 = Y$

Moles of $N_2 = Y \dfrac{(1-\phi)}{\phi}$

Moles of Air $= \dfrac{Y}{\phi}$

Moles of effluent gas $= 100 - \dfrac{Y}{\phi}$

And thus the moles of NO is calculated from the measured PPM of $NO_Y$ at $Y$ % $O_2$ by the equation:

$$NO = \frac{NO_y}{10^6}\left[\frac{Y}{\phi}M_a + \left(100 - \frac{Y}{\phi}\right)M_g\right]$$

Now if Z is defined as the moles of air required to achieve $X$% $O_2$:

$$X = \frac{(\phi Z)\,100}{Z + 100 - \dfrac{Y}{\phi}}$$

and factoring:

$$Z = \frac{(100 - Y/\phi)\,X}{100\,\phi - X}$$

Now the parts per million of NO at $X$% $O_2$ is:

$$NO_x = NO_y\left[\frac{Y\,M_a/\phi + (100 - (Y/\phi))M_g}{(100 - Y/\phi)\,M_g + M_a[X(100 - Y/\phi)/100\,\phi - X)]}\right]$$

Now the weight of a mole of air is approximately equal to that of a mole of dry effluent gas resulting from the combustion process.

$$M_g \approx M_a$$

Thus, by substituting this into $NO_x$ and factoring $$NO_x = NO_y\left[\frac{1 + Y/(100\,\phi - Y)}{1 + X/(100\,\phi - X)}\right]$$

which factors to $$NO_x = NO_y\left[\frac{100\phi - X}{100\,\phi - Y}\right]$$

since the amount of oxygen present in the air is 21% or the mole fraction:

$\phi = 0.21$

In the presently considered system by way of example, it has been determined that 3% $O_2$ is the corrected reference level for excess $O_2$. Thus $X = 3\% \; O_2$ and obviously, $$NO_x = NO_y\left[\frac{21 - 3}{21 - Y}\right] = NO_y\left[\frac{18}{21 - Y}\right] \quad (1)$$

The above derivation involves a specific example and results in equation (1). A more general equation based on such a derivation would be:

$$W_f = W_i\left[\frac{C - X_f}{C - Y_i}\right] \quad (2)$$

where:

$W_f$ is the parts per million of gas corrected to a reference level ($NO_x$ in the above example).

$W_i$ is the measured parts per million of the component gas in the effluent ($NO_Y$ above).

$C$ is the percentage of the reference gas in any leakage effluent gas ($\phi$ above).

$X_f$ is the percentage of the reference which the measurement $X_f$ is to be corrected to as corrected excess reference gas ($X$ above).

$Y_i$ is the percentage of reference gas measured ($Y$ above).

Figure 2:
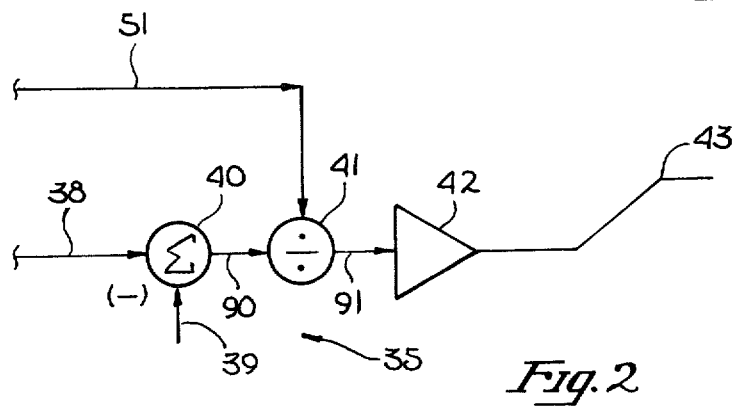
FIG. 2 is a schematic block diagram of the electronic signal corrector shown in FIG. 1.

Referring to FIG. 2, an electrical schematic is illustrated which implements equation 1. This circuit includes a summing means 40 (which may be a subtracting means) a dividing means 41 and an amplifier 42 (which may be an operational amplifier or other amplifier). The summing means 40 is adaptable for receiving two signals, one on line 38 and the other on line 39 for producing a signal representative of sum on line 90. Line 38 is coupled to analyzer 33 while line 39 is coupled to a reference signal means which may be a source of a constant signal or potential such as a battery, and is adjustable for any $X_f$ desired. The divider 41 is adaptable for receiving two signals, one representative of the numerator (line 90) and the other representative of the denominator (line 51). Line 51 is coupled to analyzer 31. Divider means 41 provides an output signal on line 91 representative of a quotient. Line 91 is coupled to the input of amplifier 42. This amplifier may be utilized to isolate the output line 43 from line 91 and also multiplies the input signal on line 91 by a predetermined constant. The summing means 40, dividing means 41 and amplifier 42 may be fabricated from ordinary discrete electrical components utilizing commonly known circuits as is done in the presently preferred embodiment. In the presently preferred embodiment the summing means 40, dividing means 41 and amplifier 42 operate upon analog signals such as the analog signals from analyzers 31 and 33. A circuit for implementing equation (1) and again utilizing a summing means and dividing means may also be fabricated from circuitry utilizing commonly known digital circuits. In such an implementation, the signals from analyzers 31 and 33 may be sampled and converted to digital form as is commonly done and the resultant digital signals may then be summed and divided in order to achieve the operations indicated by equation (1).

Referring specifically to equation (1), a signal representative of the denominator (21−Y) is generated on line 90, is divided by the signal representative by NO$_Y$ present on line 51. The quantity (21−Y) is formed by the summing means 40 by combining the signal from the reference signal means (for the case illustrated the constant 21) with the output from analyzer 33. Note that in equation (1) the denominator includes a minus sign indicating the summing means 40 performs a subtraction function. This may readily be achieved by using a reference signal having a negative value on line 39 or by utilizing a summing means adaptable for subtracting. The signal representing NO$_Y$ is of course generated by analyzer 31. The output from dividing means 41, a signal appearing on line 91, is $$\left[ \frac{NO_y}{21-Y} \right]$$

Amplifier 42 provides the function of multiplying the results of this division by a constant such as the constant 18 shown in equation (1). The output from amplifier 42 is then equal to NO$_x$ (line 43). Thus, the circuitry of FIG. 2 may be utilized to electrically implement equation (1).

Although the presently preferred embodiment shows a particular calibration arrangement for each gas analyzed, separate embodiments of the invention may contain different arrangements. For example, a first gas may require zero and span gas calibration, a second gas may require only span, and a third gas may require only zero calibration. The invention is also not restricted to just three analyzers as is shown in the presently preferred embodiment, but may have as many as are required in any particular application.

The system also utilizes several safety features to optimize performance. For example, at prescribed intervals the automatic timer 80 activates valve 24 and back purges the probes 21, 22 and 23. The back purging forces air to be disposed back through conduit 60, purge valve 47, valve 24 into the probes, thereby cleaning the probes of any particulate matter which may have accumulated. Also a relief valve 29 is is disposed on conduit 64 immediately adjacent the condenser and is used to prevent any anomolus pressure surges from reaching the gas analyzers, and also maintains continuous sample flow through pump 26 and condensor 28 during calibration to minimize time lags and transients.

Now having described the physical characteristics of the presently preferred embodiment a typical use for operation will be described.

A schematic of the presently preferred embodiment is shown in FIG. 1. The system uses a positive displacement pump 26 to continuously draw samples from the probes 21, 22 and 23. The sample passes in turn through filter elements 25 to remove particulate matter, and through refrigerated condenser 28 to remove excess moisture. After being drawn through the condenser 28 the sample passes a relief valve 29 which prevents anomolus pressure surges from reaching the analyzers 31, 33 and 34 and also allows continuous sample pumping when valves 30 and 32 are closed to the sample line 66. The sample is then passed through two valves 30 and 32 in their normally open position to analyzing instruments 31, 33 and 34. The sample gas is then analyzed in each of the analyzers and the CO analyzer 34 generates an electrical signal on line 88 representative of the concentration of CO in the effluent. The NO and O$_2$ analyzers 31 and 33 also generate electrical signals on lines 51, 38 and 95 representative of the concentrations of NO and O$_2$ present in the sample. The NO signal on line 51 and the O$_2$ signal on line 38 are fed into the electronic signal corrector 35 where the NO signal is corrected electronically to a signal on line 43 representative of the percent NO corrected to a specified reference level.

The signals on lines 43, 88 and 95 are fed into a recorder 36 which maintains a continuous permanent record. The electronic signal corrector generates a second signal on line 94 which activates an alarm 37 when given conditions exist. Most often the condition is that the percent NO in the effluent has reached the maximum allowable. The alarm warns the operators who must take action to reduce the percent NO in the effluent.

The system periodically has the capability of automatically calibrating itself. At prescribed intervals a timer 80 activates the control valves 27, 30 and 32 as previously described. Calibration is automatically accomplished using electromechanical circuits and servomechanisms well known in the art and shown in FIG. 1 as servo-mechanisms Nos. 1, 2 and 3. These servomechanisms are also activated by electrical signals which originate from the timer 80. For example, the signal generated using calibration gas is compared to a built-in reference signal. Any difference between these signals is proportional to the error and is converted to motor drive signal. The motor then resets a potentiometer which controls the analyzer gain until the error signal is zero. The analyzer is now calibrated and is returned to its normal sampling mode.

The invention may be used, for example, to monitor effluent from utility boilers, and to provide a continuous measure of nitric oxide (NO), carbon monoxide (CO), and oxygen (O$_2$), concentrations in the flue gas, such as has been illustrated in the presently preferred embodiment. However, the invention is not limited to this embodiment. The system may monitor a greater or lessor number of gasses, the number of probes may vary, the types of gasses monitored can be different as well as the gasses which are required to be corrected to a standard reference level.

Thus, the invention herein described is an effective tool that can be used to monitor industrial effluent so that environmental criteria can be examined.

We claim:

1. A system for monitoring effluent gas and for determining the concentration of at least one gas in said effluent gas at predetermined reference conditions comprising:
   a. sampling means for sampling said effluent gas and for providing a sample;
   b. an analyzing means for analyzing said sample to determine the concentration of at least one gas in said sample, and for generating at least a first electrical signal representative of the concentration of a first gas, said analyzing means being coupled to said sampling means; and,
   c. correcting means for electrically correcting at least said first electrical signal from said analyzing means to a standard reference gas level, said correcting means being electrically coupled to said analyzing means whereby, said corrected electical signal may be displayed or otherwise monitored, so that the concentration level of at least one gas in said effluent gas may be absolutely determined.

2. The system described in claim 1, wherein said sampling means includes a pump for obtaining said sample and for forcing said sample through said system, a filter for separating particulate matter from said sample, a condensing means for removing moisture from said sample and a purge means for purging said sampling means.

3. The system described in claim 1, wherein said correcting means electrically performs the following computation:

$$W_f = W_i \left[ \frac{C - X_i}{C - Y_i} \right]$$

Where:
$W_f$ is the parts per million of said gas corrected to said reference level,
$W_i$ is the measured parts per million of said gas,
$C$ is the percentage of said reference in any leakage gas,
$X_i$ is the percent of said reference gas as corrected excess of said reference gas,
$Y_i$ is the percent of said reference gas measured.

4. The system described in claim 1 having a calibrating means for automatically and periodically comparing a signal generated using a reference calibration gas with a predetermined calibration reference signal provided by said calibration means to generate an error signal, said calibrating means including means for resetting the analyzer means, as required, to obtain a zero error signal.

5. The system described in claim 4, wherein said calibrating means calibrates said analyzing means for zero conditions.

6. The system described in claim 4, wherein said calibrating means calibrates said analyzing means for span conditions.

7. A system for monitoring effluent gas for determining the concentration of at least a first and second gas in said effluent gas comprising:
  a. a sampling means for sampling said effluent gas and for providing a sample;
  b. a plurality of analyzing means for analyzing said sample to determine the concentration of at least said first and second gas in said sample, and for generating at least a first electrical signal representative of the concentration of said first gas, and a second electrical signal representative of the concentration of said second gas, said analyzing means being coupled to said sampling means; and
  c. a correcting means for electrically correcting at least said first electrical signal from said analyzing means to a standard reference gas level, said correcting means being electrically coupled to said analyzing means whereby, said corrected electrical signals may be displayed or otherwise monitored, so that the levels of concentrations of at least said first and second gas in said effluent may be known.

8. The system described in claim 7, wherein said correcting means comprises a summing means coupled to a dividing means.

9. The system described in claim 8, including a means for producing a constant reference signal corresponding to a predetermined corrected excess of reference gas, wherein said first electrical signal is summed with said reference signal in said summing means.

10. The system described in claim 9, wherein the output from said summing means is divided by said second electrical signal in said dividing means.

11. The system described in claim 7, wherein said sampling means includes a pump for obtaining said sample and for forcing said sample through said system, a filter for separating particulate matter from said sample, a condensing means for removing moisture from said sample and a purge means for purging said sampling means.

12. The system described in claim 7, wherein said correcting means electrically performs the following computation:

$$W_f = W_i \left[ \frac{C - X_i}{C - Y_i} \right]$$

Where:
$W_f$ is the parts per million of said gas corrected to a reference level,
$W_i$ is the measured parts per million of said gas,
$C$ is the percent of said reference gas in any leakage gas,
$X_i$ is the percent of said reference gas as corrected excess of said reference gas,
$Y_i$ is the percent of said reference gas measured.

13. The system described in claim 7 having a calibrating means for automatically and periodically comparing a signal generated using a reference calibration gas with a predetermined calibration reference signal provided by said calibration means to generate an error signal, said calibrating means including means for resetting the particular analyzer being calibrated, as required, to obtain a zero error signal.

14. The described in claim 13, wherein said calibration means calibrates said analyzing means for zero conditions.

15. The system described in claim 13, wherein said calibrating means calibrates said analyzing means for span conditions.

* * * * *